(12) United States Patent
Montemont

(10) Patent No.: US 7,881,893 B2
(45) Date of Patent: Feb. 1, 2011

(54) METHOD FOR CORRECTING BIPARAMETRIC SPECTRA

(75) Inventor: Guillaume Montemont, Grenoble (FR)

(73) Assignees: Commissariat a l'Energie Atomique, Paris (FR); Compagnie Generale des Matieres Nucleaires, Villacoublay (FR)

(*) Notice: Subject to any disclaimer, the term of this patent is extended or adjusted under 35 U.S.C. 154(b) by 0 days.

(21) Appl. No.: 11/587,645

(22) PCT Filed: Apr. 21, 2005

(86) PCT No.: PCT/FR2005/050270

§ 371 (c)(1),
(2), (4) Date: Oct. 26, 2006

(87) PCT Pub. No.: WO2005/114257

PCT Pub. Date: Dec. 1, 2005

(65) Prior Publication Data

US 2008/0061224 A1    Mar. 13, 2008

(30) Foreign Application Priority Data

May 3, 2004  (FR) .................................. 04 04763

(51) Int. Cl.
*G01D 5/34* (2006.01)
(52) U.S. Cl. .......................... 702/85; 702/81; 702/134; 702/183

(58) Field of Classification Search ............... 702/85, 702/97, 104, 124, 182, 183; 250/370.01; 324/102; 370/241; 700/83
See application file for complete search history.

(56) References Cited

U.S. PATENT DOCUMENTS

| | | | |
|---|---|---|---|
| 5,821,538 A * | 10/1998 | De Antoni et al. | 250/370.01 |
| 5,854,489 A | 12/1998 | Verger et al. | |
| 5,866,907 A * | 2/1999 | Drukier et al. | 250/366 |
| 5,946,300 A * | 8/1999 | Wilbrod | 370/241 |
| 6,329,651 B1 * | 12/2001 | Mestais et al. | 250/252.1 |
| 7,304,307 B2 * | 12/2007 | Wellnitz et al. | 250/369 |

FOREIGN PATENT DOCUMENTS

| | | |
|---|---|---|
| FR | 2 738 693 | 3/1997 |
| FR | 2 738 919 | 3/1997 |
| FR | 2 790 560 | 9/2000 |

* cited by examiner

*Primary Examiner*—Eliseo Ramos Feliciano
*Assistant Examiner*—Felix E Suarez
(74) *Attorney, Agent, or Firm*—Oblon, Spivak, McClelland, Maier & Neustadt, L.L.P.

(57) ABSTRACT

A method for processing a two-parameter spectrum including selecting a profile parameter for the spectrum and an initial correction function, for any profile selected according to this parameter, carrying out at least a correction operation by multiplying this selected profile by a correction function, equal to the sum of at least a portion of the already corrected profiles.

22 Claims, 4 Drawing Sheets

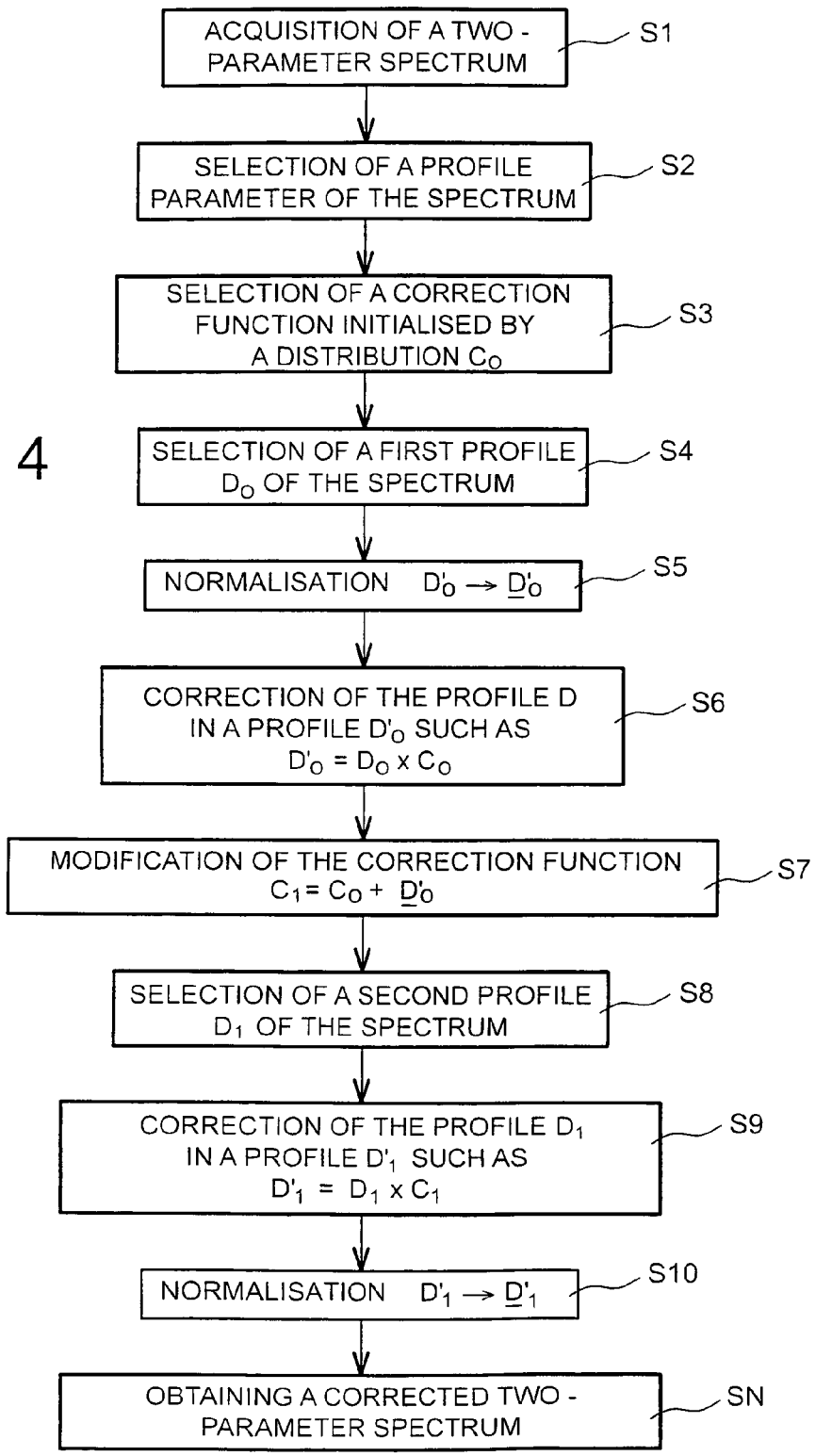

METHOD FOR CORRECTING BIPARAMETRIC SPECTRA

TECHNICAL FIELD AND PRIOR ART

The invention relates to the field of signal processing, in particular x-ray or gamma-ray spectrometry.

This technique uses a semiconductor detector, which often contains charge carrier collection defects.

In incident radiation spectrometry, an attempt is made to determine the quantity of charge carriers created by the interaction of X or gamma photons.

To this end, an electrical field is applied to a semiconductor material using electrodes, so as to drain these charges and induce an electrical signal having an amplitude that is proportional to their quantity. Unfortunately, the measurement of this quantity of carriers is rendered difficult by the imperfect transport properties of the semiconductor: in fact, a portion of the charges does not reach the electrodes. This is the problem of incomplete collection.

One of the techniques proposed for correcting this incomplete collection is to use, in addition to the measurement of amplitude, the measurement of one or more other parameters on the shape of the electrical signal obtained (e.g., its rise time), making it possible, in particular, to go back to the site of interaction of the photon in the semiconductor medium. Thanks to the calibration of the collection efficiency as a function of the interaction site, it is then possible to determine the charge actually deposited by the photon.

An example of this type of method is disclosed in the French Patent Application FR 2 738 919 or in the document FR 2 738 693.

This type of correction method consists in measuring the amplitude and rise time of the electrical signal obtained at the output of a charge pre-amplifier connected to the electrodes of the device, and in then recording the two quantities simultaneously. The data is stored in a two-dimensional histogram called a two-parameter spectrum.

Calibration of the amplitude/time relationship is then carried out on two reference energies E1 and E2, known to be present in a radioactive calibration source.

In this way, two amplitude/time calibration curves $A_1(T)$ and $A_2(T)$ are obtained, which are then used to correct the loss of charge for the entire spectrum and to estimate the energies equivalent to the various amplitude/time pairs:

$$E=\text{Gain}(T)A+\text{Shift}(T),$$

With $$\text{Gain}(T)=(E_2-E_1)/(A_2(T)-A_1(T)),$$

$$\text{Shift}(T)=E_1-\text{Gain}(T)A_1(T)$$

All of the amplitude/time pairs corresponding to the various interactions are corrected by this technique that we designate by the term "homothety".

However, this method causes too much degradation to the information contained in a two-parameter spectrum.

Thus, FIG. 1 shows a raw two-parameter spectrum, with the rise time T on the y-axis and the amplitude A on the x-axis.

This type of spectrum contains two other pieces of information: the energy (as explained in the document FR 2 738 919) and the number of photons n.

Thus, the two scatter plots 10 and 11 overlapping each other in FIG. 1 correspond to two different energies Ea and Eb.

In fact, the complete illustration is a three-dimensional illustration consisting of a set of 3-D curves, like those referenced as 13, 14 and 15 in FIG. 2, each curve providing, for each given energy, the number of photons n in relation to the rise time T and amplitude A of the signal.

FIG. 3 shows the two-parameter spectrum corrected by the so-called "homothetic" method. Thanks to this homothetic correction, the scatter plots 10 and 11, whose amplitudes overlap each other, are transformed into two other separate amplitude scatter plots 10a and 11b corresponding to said two different energies Ea and Eb.

However, the corrected two-parameter spectrum contains degraded information: it is seen that, in comparison with the illustration of FIG. 1, the signals relating to the scatter plots 10a and 11b are widened in comparison to the signals relating to the scatter plots 10 and 11.

If the scatter plots 10 and 11 of FIG. 1 had been even more similar, the two scatter plots 10a and 10b of FIG. 3 might overlap each other.

Homothetic correction is therefore not entirely satisfactory. The energy spectrum resulting from the homothetic method does not therefore use all of the information present in the two-parameter spectrum.

This results in the impossibility of correctly using low-amplitude pulses, even though they might be detected and identifiable at a given energy peak.

The problem thus occurs of finding an improved correction method and device, which would enable the information contained in a two-parameter spectrum to be used more comprehensively.

DISCLOSURE OF THE INVENTION

According to the invention, it is not possible to estimate the energy corresponding to one pulse separately from the others.

First of all, the object of the invention is a method for processing a two-parameter spectrum comprising:
- the selection of a profile parameter for the spectrum, and an initial correction function,
- for any profile selected according to this parameter, the carrying out of a correction operation by multiplying this selected profile by a correction function, equal to the sum of at least a portion of the already corrected profiles.

Said two-parameter spectrum may be of the time-amplitude type, for example. Said profile parameter may then be the rise time of the spectrum, the profiles then being capable of being selected in decreasing order of the rise times or, better yet, in decreasing order of precision or resolution.

The signal to which the method according to the invention applies may be a signal or a two-parameter spectrum already processed or corrected by homothety.

The initial correction function, for example, is a uniform distribution.

Said correction operation may further include a normalisation step.

Thus, according to a first alternative, said correction operation may further include division by an integral of said correction function.

According to a second alternative, said correction operation may further include another multiplication by a ratio of an integral of said selected profile to another integral of the selected profile multiplied by said correction function.

According to a third alternative for which said spectrum is representative of a distribution of a number of photons varying across various rise-time channels and various amplitude channels, said distribution being determined with a close uncertainty of measurement, said correction operation may further include a localised normalisation step comprising:

division of said selected profile by a convolution of said correction function and said uncertainty function;

a step for amplitude channel redistribution by amplitude channel of the distribution of the number of photons in said profile, selected using a so-called uncertainty function dependent on said uncertainty of measurement.

Said uncertainty function, for example, may be of the Gaussian type whose standard deviation depends on said uncertainty of measurement.

This invention also relates to a device for processing a two-parameter spectrum, e.g., of the time-amplitude type, comprising:

means for selecting a profile parameter for the spectrum, and an initial correction function, for any profile selected according to this parameter, means for performing a correction operation by multiplying this selected profile by a correction function equal to the sum of at least a portion of the already corrected and normalised profiles.

According to one particular embodiment, this processing device may further include means for classifying all the profiles of the spectrum according to a resolution quality criterion, as well as means for selecting the profiles of the spectrum according to an increasing or decreasing order of resolution quality.

The processing device according to the invention may also possibly include means for correcting the spectrum by homothety.

The invention further relates to a device for processing a two-parameter spectrum, comprising:

means for selecting a profile parameter for the spectrum and an initial correction function, programmed means for implementing a spectrum processing method according to the invention and as described previously.

Also anticipated within the scope of this invention is a medical imaging device comprising: a semiconductor detector or matrix of semiconductor detectors, means for acquiring a two-parameter spectrum, a device for processing the two-parameter spectrum according to the invention, means for displaying information relating to the processing of the two-parameter spectrum.

BRIEF DESCRIPTION OF THE DRAWINGS

FIG. 4 is a schematic representation of the steps of a method according to the invention.

DETAILED DISCLOSURE OF PARTICULAR EMBODIMENTS

An exemplary method according to the invention will be described in connection with the flowchart of FIG. 4.

In a first step S1, it is assumed that a two-parameter spectrum has been obtained.

As was explained earlier in the presentation of the prior art, said obtained two-parameter spectrum contains, in particular, information relating to a distribution of a number of photons n across various amplitude channels and various rise-time channels. A number of photons for a given rise-time channel and for a given amplitude channel of the spectrum corresponds to a frequency or occurrence number for a pair (rise time, amplitude of a signal) Thus, in order to designate a number of photons n for a given amplitude channel and rise-time channel of the spectrum, the term "number of hits" will be used throughout this description.

Figure 1:
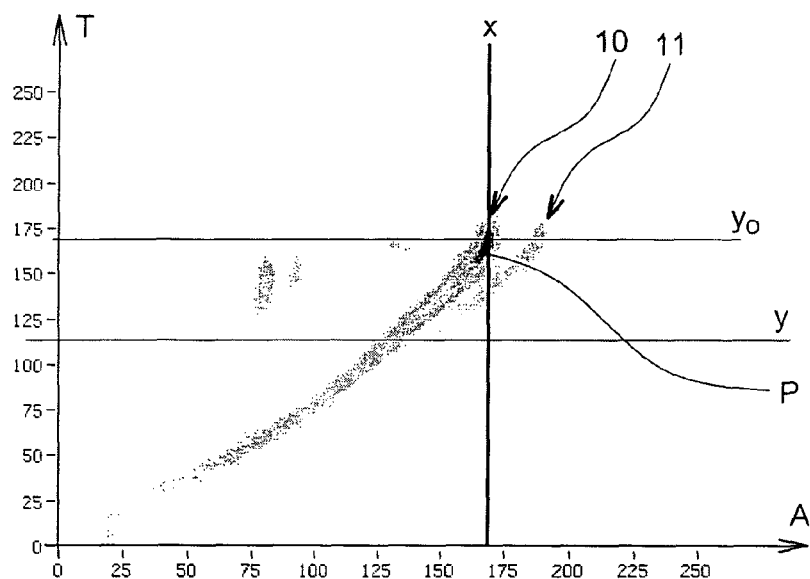
FIGS. 1-3 show two-parameter spectra.
Figure 2:
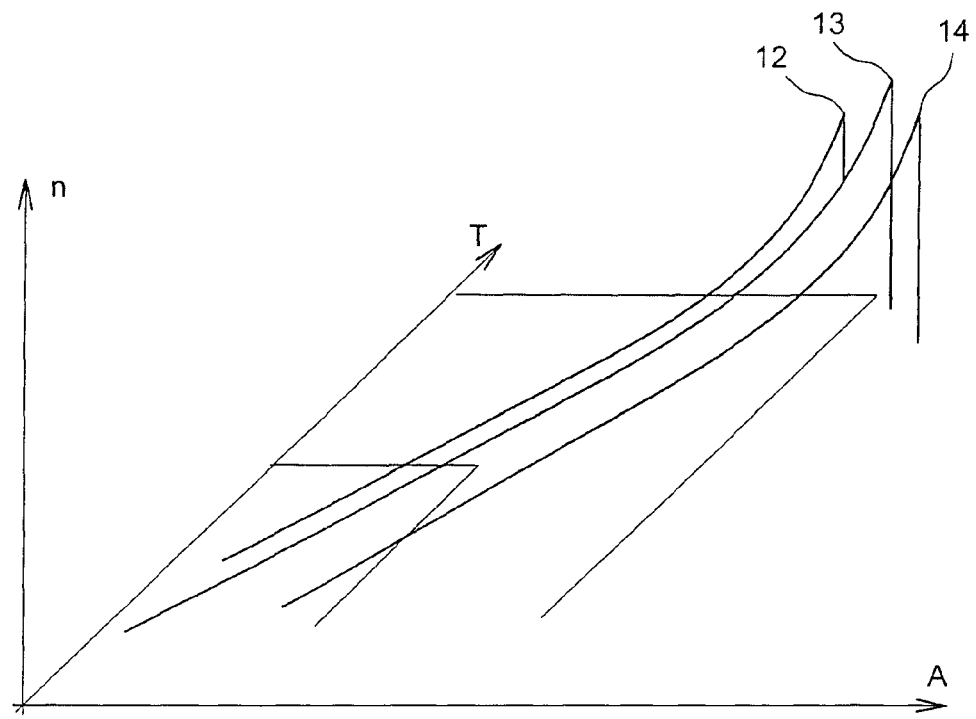
Figure 3:
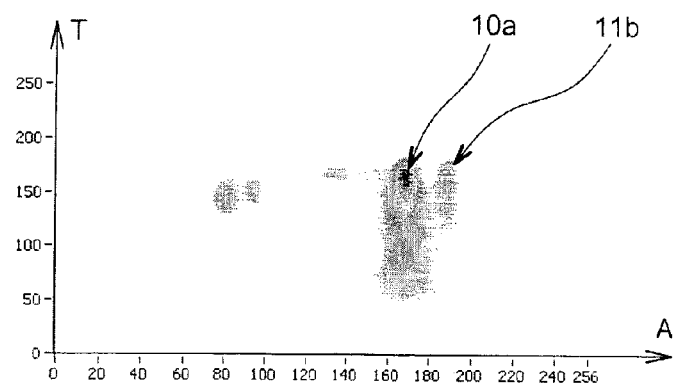

The spectrum obtained, for example, may be a spectrum such as the one shown in FIG. 1, or a spectrum corrected by homothety, as shown in FIG. 3.

Then (step S2), a given profile parameter is selected from among the parameters of the spectrum, such as a rise-time parameter, as well as a correction function (step S3), initialised by a distribution written as $C_0$, e.g., a uniform-type distribution.

Steps S2 and S3 may be carried out simultaneously or in any order.

Iterative processing is then carried out, during which, according to a step S4, a first distribution or a first profile of the two-parameter spectrum, written as $D_0$, is selected as a constant profile parameter. This selection, for example, may be that of a spectrum profile having a constant rise time, which will then correspond to a selection of the distribution of the number of photons n across the various amplitude channels, for a given rise time.

The selection of such a profile may meet one or more criteria and may be shown, for example, by plotting a horizontal line that is orthogonal to the y-axis in FIG. 1.

On the two-parameter spectrum, a constant rise-time profile corresponds to a set of discrete digitised values. It is during the course of digitising the measurements resulting in the two-parameter spectrum that a precision choice is made. This precision corresponds to the digitising step that may be chosen, in particular, on the basis of the uncertainty in the measurement of the rise times.

Preferably, a profile is selected comprising a high-intensity peak, e.g., the profile comprising the highest intensity peak, as defined in FIG. 1 by the horizontal line $y_0$ passing through the peak P (the intensity of which is proportional to the grey level of the spectrum image).

The selection can be carried out according to a resolution criterion for the profile. For example, the profile having the highest resolution can be selected from among all the constant rise-time profiles of the spectrum. Thus, processing can be started on the basis of the rise-time channels containing the most "precise" peak or peaks. In order to enable selection of this type, classification by resolution criterion of the various profiles of the spectrum, each profile being a constant rise-time profile, can be carried out prior to step S4, e.g., immediately after step S2 of the method. The resolution may be calculated in particular with respect to the full width at mid-height of the peaks contained in each profile.

Then, the first profile $D_0$ is corrected at least by a multiplication by the correction function initialised to the distribution $C_0$ (step S6).

An at least partially corrected profile is then obtained, written as $D'_0$:

$$D'_0 = D_0 \times C_0$$

The correction can be completed by a step that will be called "normalisation" (step S5), which can be carried but prior to, at the same time as, or after the multiplication step S6. The corrected and normalised profile will be written as $\underline{D}'_0$.

According to a first alternative implementation, this normalisation may consist in dividing the first at least partially corrected profile $D'_0$ by the integral over all of the amplitude channels (that will be written as $\Sigma C_0$) of the correction function $C_0$, such that:

$$D'_0 = D_0 \times \frac{C_0}{\sum C_0} \qquad (1)$$

In the preceding expression (1), as throughout the remainder of this description, '$\Sigma$' represents a sum over all of the channels.

According to a second alternative, which is improved in comparison with the first, the normalization step S6 may consist in multiplying the first corrected profile $D'_0$ by a ratio (written $$\frac{\sum D_0}{\sum D_0 \times C_0}$$

of the integral over all of the amplitude channels of the first profile (written $\Sigma D_0$) and of the integral over all of the amplitude channels of the first corrected profile (written $\Sigma D_0 \times C_0$), such that:

$$D'_0 = D_0 \times C_0 \times \frac{\sum D_0}{\sum D_0 \times C_0}$$

The count of the number of photons contained in this first corrected and normalised profile will thereby be the same as that of the profile $D_0$ before correction.

Then, after normalisation, the correction function initialised to $C_0$ is modified (step S7). The latter is incremented by adding to it the first corrected profile. A new correction function written as $C_1$ is thus formed such that:

$C_1 = C_0 + \underline{D}'_0$

This correction function $C_1$ may serve as a correction function for another constant rise-time profile and make it possible to consider information relating to the first corrected profile.

Processing of the type carried out during steps S4 to S7 is then carried out on another constant rise-time profile of the two-parameter spectrum. Thus, a second constant rise-time profile $D_1$ is first selected, e.g., by going in the direction of the decreasing rise times, starting with the first profile, or, for example, according to a resolution criterion, e.g., by choosing the profile having the highest resolution from among all of the constant rise-time profiles of the spectrum left to be processed.

The second profile is then multiplied by the modified correction function $C_1$ (step S9), consisting of the sum of the initial correction function $C_0$ and the first corrected profile $\underline{D}'_0$. A second, at least partially corrected profile $D'_1$ is thereby obtained:

$D'_1 = D_1 \times C_1$ $D'_1 = D_1 \times [C_0 + \underline{D}'_0]$

In the same way as for processing the first profile, a second normalisation step for the second profile can be carried out, of the type carried out for the first profile (step S10), and possibly at the same time as the multiplication step S9.

In the case where the first alternative normalisation in step S6 has been used, this second normalisation may consist in dividing the second at least partially corrected profile by the integral over all of the amplitude channels of the new correction function $C_1$:

$\underline{D}'_1 = D'_1 / \Sigma C_1$ $\underline{D}'_1 = (D_1 \times C_1) / \Sigma C_1$ $\underline{D}'_1 = (D_1 \times [C_0 + \underline{D}'_0]) / \Sigma [C_0 + \underline{D}'_0]$ In the case where the second alternative normalisation in step S6 has been used, this second normalisation may consist in multiplying the second corrected profile $D'_1$ by a ratio of the integral over all of the amplitude channels of the second profile $D_1$ (written $\Sigma D_1$) and of the integral over all of the amplitude channels of the first corrected profile (written $\Sigma D_1 \times C_1$) such that:

$$D'_1 = D'_1 \times \frac{\sum D_1}{\sum D_1 \times C_1}$$

$$D'_1 = D_1 \times C_1 \times \frac{\sum D_1}{\sum D_1 \times C_1} \quad \text{with } C_1 = [C_0 + \underline{D}'_0]$$

$$D'_1 = D_1 \times [C_0 + \underline{D}'_0] \times \frac{\sum D_1}{\sum D_1 \times [C_0 + \underline{D}'_0]}$$

The operation just described is renewed for all of the successive profiles selected. Each profile $D_k$ is thus first multiplied by a correction function $C_k$ taking into account the previously corrected and then normalised profiles, such that:

$D'_k = D_k \times C_k$, for multiplication with $C_k = C_{k-1} + \underline{D}'_{k-1}$ and $\underline{D}'_{k-1}$ a profile that has been corrected and normalised immediately before the profile $D_k$, and $$\underline{D}'_k = D_k \times \frac{C_k}{\sum C_k}$$

for normalisation, in the case where the first normalisation alternative has been followed, or $$\underline{D}'_k = D_k \times C_k \times \frac{\sum D_k}{\sum D_k \times C_k}$$

in the case where the second normalisation alternative has been followed.

All of the constant rise-time profiles of the two-parameter spectrum are processed in this way. After processing all of the profiles, the final two-parameter spectrum is corrected (step $S_N$).

The correction function obtained at the end of the method will be written as $C_N$. The function $C_N - C_0$, i.e., the final correction function $C_N$ from which the initial distribution $C_0$ is subtracted, itself corresponds to an energy spectrum that has been constructed iteratively for all of the rise times, from the corrected two-parameter spectrum.

The method according to the invention may be combined with a homothetic processing method as described previously in the presentation of the prior art.

In the case of a two-parameter spectrum previously processed by homothety, it is possible to proceed in the following manner:

Two parameters (typically amplitude A and rise time T) are acquired, then calibration is carried out on two reference peaks, making it possible to calibrate a gain (T) and a shift (T).

Then, aided by one of the reference peaks, the various rise-time channels of the spectrum are classified, typically from the most precise (the one whose profile has the best resolution) to the least precise. Then, an energy spectrum is iteratively constructed.

For each rise time T of the two-parameter spectrum, the various channels are processed according to the following method:

1) For a given rise time, each amplitude channel is corrected according to the law E=gain(T)A+Shift(T), i.e., the channel hits are redistributed according to a law (of an appropriate type, e.g., Gaussian gain width (T)×1 channel) centred on E. Thus, a profile $D_k$ of the spectrum, for said given rise time, is corrected homothetically.

2) Prior knowledge is taken into account by multiplying this profile or this distribution $D_k$ by a correction function $C_k$ obtained thanks to the previously corrected distributions.

3) The resulting distribution $D'_k$ is normalised in order to assign it the number of hits equal to the number of channel hits to be corrected.

4) The correction function $C_k$ is modified by adding to it the corrected and normalised distribution $\underline{D}'_k$.

5) The process is repeated in order to process all of the points of the two-parameter spectrum.

At the end of processing, a final correction function is obtained, written as $C_N$. A function written as $C_N-C_{-0}$, equal to the final correction function from which the initial correction function is subtracted, corresponds to said energy spectrum obtained by a cumulative total of all of the rise times.

It is to be noted that the correction function can be initialised by a uniform distribution, so as to indicate the absence of initial knowledge.

The count of the number of photons or number of hits initially included in the correction function corresponds to a quantity of statistically reliable and therefore significant information.

Regardless of the starting two-parameter spectrum, the processing timeline for the various rise times can be selected in advance.

It is preferable to begin with the most precise points of the spectrum. To do so, the various points of the two-parameter spectrum are classified by order of precision. This classification does not necessarily have any correlation with the arithmetic order of the rise-time values (in other words the classified points are not necessarily juxtaposed on the spectrum). The spectrum referenced as 16 corresponds to a sum from all of the rise times of the two-parameter spectrum corrected using the method according to the invention and corresponds to a graphic representation of the correction function $C_N$ obtained at the end of the method according to the invention, from which the initial correction function $C_0$ has been subtracted.

It is possible to apply this principle less strictly, and to thereby choose a processing timeline according to a decreasing order of the rise times, knowing that the profiles in the regions of the spectrum corresponding to high signal amplitudes are generally more precise than profiles in regions of the spectrum corresponding to low amplitudes.

For other reasons, any increasing or random or predetermined order may be chosen.

Another example of a method according to the invention uses local normalisation during processing of the two-parameter spectrum, thanks to an uncertainty function that will be written as G.

In this exemplary method, each constant rise-time profile of the two-parameter spectrum is corrected, for example, in an order following a pre-established classification based on a resolution criterion.

For a given selected constant rise-time profile $D_k$ (represented, for example, by the plotting of a horizontal line that is orthogonal to the y-axis in FIG. 1), this profile is processed, amplitude channel after amplitude channel, for all of the various amplitude channels, according to the following method:

For a given amplitude channel i (represented, for example, by a vertical broken line orthogonal to the x-axis in FIG. 1):

1) The number of hits or photons contained in the profile $D_k$ for said given amplitude channel i is selected, and will be written as $D_k(i)$.

2) This number is redistributed according to said uncertainty function, which is centred on said given amplitude channel i, and will thus be written as $G_i$.

This uncertainty function, for example, may be a Gaussian distribution whose standard deviation depends on the uncertainty of the measurements, which made it possible to obtain the two-parameter spectrum.

3) The result of this redistribution is multiplied by a correction function $C_k$, and normalised. The correction function $C_k$ can be obtained, as was described previously, by summation of the previously processed and corrected constant rise-time distributions. As concerns normalisation, it may be division by an integral, over all of the amplitude channels, of the product of the centred uncertainty function $G_i$ by the correction function $C_k$, an integral that will be written as $\Sigma G_i \times C_k$, i corresponding to said given amplitude channel.

This normalisation, carried out in a localised manner, will make it possible to retain the number of hits $D_k(i)$ in the final corrected spectrum. The process just described is then repeated for all of the amplitude channels.

A total is then produced for all of the channels, in order to obtain a corrected and normalised profile that will be written as $\underline{D}'_k$.

$$\underline{D}'_k(u) = \sum_i D(i) \times \frac{Gi(u)C(u)}{\sum_v Gi(v)C(v)}$$

To summarize the processing just carried out, the number of hits for each channel i are redistributed in a region close to the channel i, according to a distribution $G_i \times C_k$, which corresponds to a local selection of the correction function around each channel i. In this way, the hits for each channel are prevented from being redistributed in regions of the spectrum distant from that in which they were initially located and where the presence of these hits would have little or no physical significance.

Processing of a profile $D_k$ of the spectrum can also be written:

$$\underline{D}'_k = \left(\frac{D_k}{C_k * G} * G\right) \times C_k$$

where '*' designates a convolution

This processing being provided for each of the constant rise-time profiles, the correction function $C_k$ is then incremented by adding to it the profile that has just been corrected.

The processing is then repeated for another constant rise-time profile. When all of the constant rise-time profiles of the two-parameter spectrum are corrected, a final correction function written as $C_N$ is obtained at the end of processing. A function written as $C_N$–$C_0$, equal to the final correction function from which the initial correction function is subtracted, corresponds to said energy spectrum obtained by a cumulative total of all of the rise times.

Figure 5:
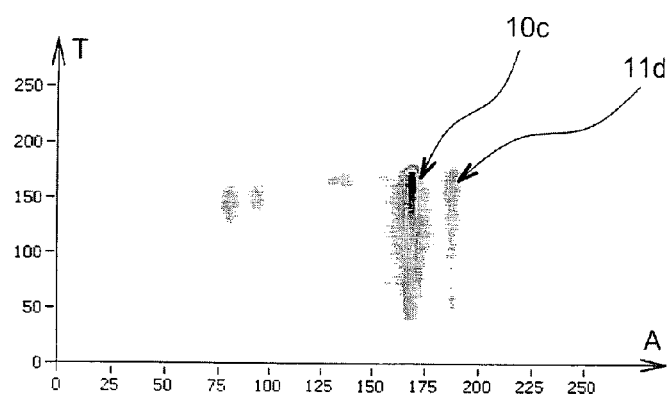
FIGS. 5 and 6 show examples of spectra obtained by a method according to the invention.

FIG. 5 shows a two-parameter spectrum corrected by a method according to the invention, of the type like that of FIG. 3 described previously, which resulted from homothetic processing. In this figure, it is seen that two separate scatter plots 10c and 11d are obtained, which are finer and better separated than in FIG. 3.

Figure 6:
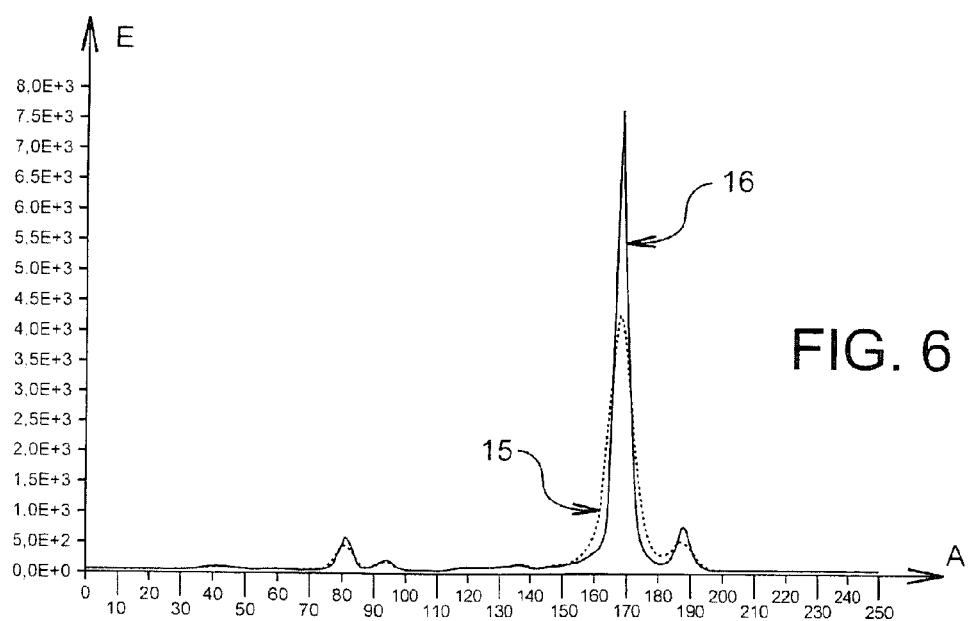

FIG. 6 shows two energy spectra referenced as 15 and 16, obtained from projections in the direction of the y-axis for a first two-parameter spectrum of the type shown in FIG. 3, and for another two-parameter spectrum of the type shown in FIG. 5, respectively. The resolution of the spectrum 16, resulting from a processing method according to the invention, is better than that of the spectrum referenced as 15, and makes it possible to better distinguish between the two energies $E_a$ and $E_b$.

Figure 7:
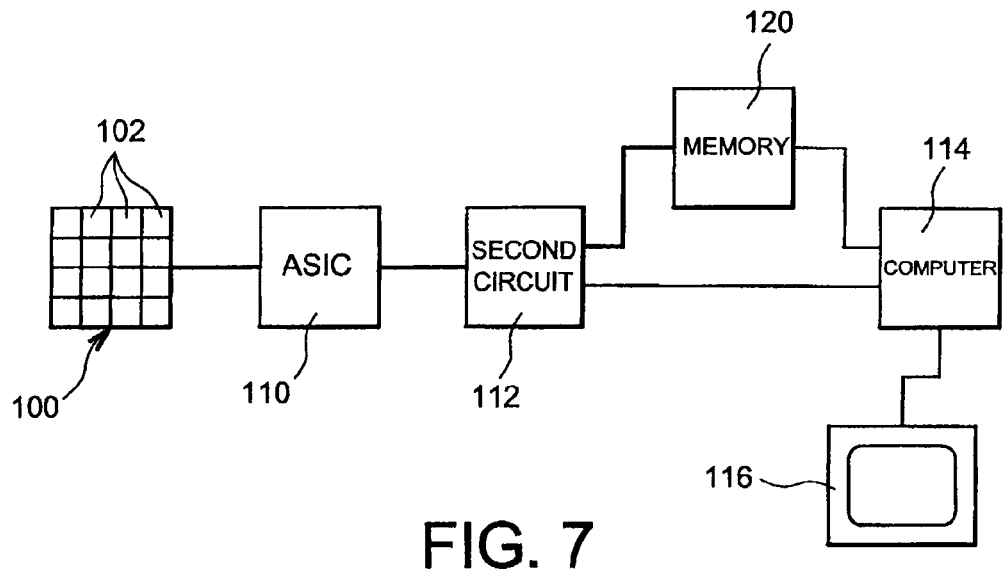
FIGS. 7 and 8 show devices for implementing a method according to the invention.

The method according to the invention can be implemented with the aid of a device as illustrated in FIG. 7.

Reference 100 in FIG. 7 designates a matrix of semiconductor detection elements 102, laid out in a detection plane.

Figure 8:
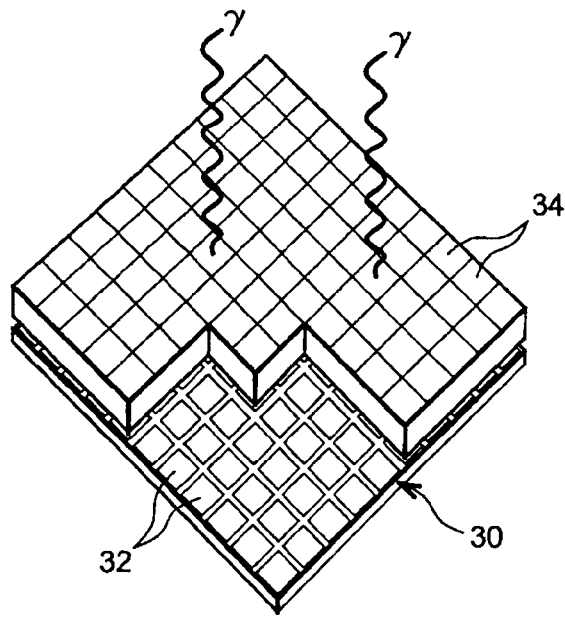

FIG. 8 shows the example of a structure for a semiconductor detector. The latter includes a platform 30 equipped with integrated electronic circuits 32 and on which a plurality of detection elements 34 is mounted.

The detection elements 34 are each in the form of a semiconductor block with two parallel opposing faces on which electrodes are provided. An electric field applied to the electrodes makes it possible to migrate the charge carriers, i.e., the electrons and the holes formed by the interaction of the radiation with the semiconductor. The electrodes, not shown in the figure, are also provided in order to receive the charges and to transfer them to the integrated circuits of the platform 30 for the formation of a detection signal.

The signals emitted by the detection elements are directed towards a first integrated circuit, e.g., an application specific integrated circuit (ASIC) 110. This circuit includes signal amplification pathways for each detection element and multiplexing means for the pathways.

A second circuit 112 is provided for determining the amplitude and the rise time for each signal and for formatting data corresponding to these quantities, as well as data representing the event coordinates. The event coordinates are associated with the position of the corresponding detection element in the detection plane. A circuit such as the circuit 112, for example, is described in the document FR 2 738 919.

The processing method according to the invention can be applied to two-parameter spectra having as a shape parameter a parameter different from the rise time, e.g., a cathode signal to anode signal ratio parameter derived from said electrodes.

The data is directed towards a computer 114 intended to perform the calculations and processing associated with the calibration phase and intended to construct an image (e.g., a medical image) from the data during the acquisition phase. The image is displayed on a screen 116.

The computer is designed or programmed to correct the two-parameter spectrum according to a method in accordance with the invention.

The data for implementing this method can be stored in the computer 114 or in a memory indicated by the reference 120 in FIG. 7. During the acquisition phase, the circuits 110 and 112 still establish the amplitude, rise time and event coordinates data from the detection element signals.

A spectrum such as that of FIG. 6 can be obtained by the processing described above. It can be displayed on the screen 116 during an acquisition operation. A device and a method according to the invention can be used within the context of medical examinations performed in nuclear medicine, as described in the introduction to the patent application FR 2 790 560, or for astrophysical observations, in the nuclear field (e.g., an observation of radioactive waste streams), in the field of non-destructive testing.

Throughout the entire foregoing, the invention has been described with the example of two-parameter (time-amplitude) spectra. The depth of the interaction of the photons in the semiconductor medium can be approximated by measurement of the rise time, or also by measurement of the anode to cathode ratio of amplitudes. The invention also applies to any other example of a two-parameter spectrum.

The invention claimed is:

1. A method for processing a two-parameter spectrum by one or more computers in a computer system, comprising:
    obtaining, at the computer system, a two-parameter spectrum, representing a distribution of a number of photons, as a function of two measured parameters,
    selecting, at the computer system, one of the two measured parameters of said two-parameter spectrum,
    selecting, at the computer, an initial correction function,
    selecting, at the computer system, a first value for the selected one of the two measured parameters,
    selecting, at the computer system, a first spectrum profile, corresponding to the first value for the selected one of the two measured parameters,
    carrying out, at the computer system, a first correction operation by multiplying said first spectrum profile by said initial correction function, to obtain a first corrected profile,
    selecting, at the computer system, a second value for the selected one of the two measured parameters,
    selecting, at the computer system, another spectrum profile, corresponding to the second value for the selected one of the two measured parameters, and
    carrying out, at the computer system, another correction operation by multiplying said another spectrum profile by another correction function, said another correction function being equal to a sum of the initial correction function and the first corrected profile.

2. The method as claimed in claim 1, wherein said first correction operation further includes a normalization step for said initial correction function, comprising dividing said initial correction function by a first integral and wherein said another correction operation further includes a normalization step for said another correction function, comprising dividing said another correction function by another integral.

3. The method as claimed in claim 2, wherein said first integral is an integral of said initial correction function and wherein said another integral is an integral of said another correction function.

4. The method as claimed in claim 1, wherein said first correction operation further includes a normalization step for said initial correction function, comprising multiplying said initial correction function by an integral of said first spectrum profile, such integral being divided by an integral of said first spectrum profile multiplied by said initial correction function and wherein said another correction operation further includes a normalization step for said another correction function, comprising multiplying said another correction function by an integral of said another spectrum profile, such integral being divided by an integral of said another spectrum profile multiplied by said another correction function.

5. The method as claimed in claim 1, wherein said two parameter spectrum is representative of a distribution of the number of photons varying across various rise-time channels and various amplitude channels, wherein said another correction operation further includes redistributing said another spectrum profile according to an uncertainty function and said another correction operation further includes normalization steps comprising:
dividing said another spectrum profile by a convolution of said another correction function and said uncertainty function, and
convoluting said another spectrum profile by said uncertainty function.

6. The method as claimed in claim 5, wherein the two-parameter spectrum is a spectrum that has previously been corrected by homothety.

7. The method of claim 1, wherein the two-parameter spectrum is a rise time—amplitude spectrum, and the selected one of the two measured parameters is a rise time of the two-parameter spectrum.

8. The method of claim 7, wherein the first spectrum profile is selected according to a decreasing order of rise times.

9. The method of claim 7, further comprising the step of:
classifying profiles of the two-parameter spectrum according to a resolution quality criterion.

10. The method as claimed in claim 1, wherein the two-parameter spectrum is a spectrum that has been previously corrected by homothety.

11. The method as claimed in claim 1, wherein the initial correction function is a uniform distribution.

12. The method as claimed in claim 1, further comprising dividing said another correction function by an integral.

13. The method as claimed in claim 1, further comprising multiplying said another correction function by a ratio of an integral of said another spectrum profile to a different integral of the another spectrum profile.

14. The method as claimed in claim 7, wherein said two-parameter spectrum is representative of a distribution of the number of photons varying across various rise-time channels and various amplitude channels, said distribution determined with a close uncertainty of measurement, said another correction operation further comprising a localised normalisation step comprising:
dividing said another spectrum profile by a convolution of said another correction function and an uncertainty function; and
redistributing by amplitude channel the distribution of the number of photons in said another spectrum profile, using an uncertainty function dependent on said uncertainty of measurement.

15. The method as claimed in claim 14, wherein said uncertainty function is a Gaussian function with a standard deviation dependent on said uncertainty of measurement.

16. A non-transitory computer readable storage medium encoded with instructions, which when executed by one or more computers, causes the one or more computers to implement a method for processing a two-parameter spectrum by one or more computers in a computer system, comprising:
obtaining a two-parameter spectrum, representing a distribution of a number of photons, as a function of two measured parameters,
selecting one of the two measured parameters of said two-parameter spectrum,
selecting an initial correction function,
selecting a first value for the selected one of the two measured parameters,
selecting a first spectrum profile, corresponding to the first value for the selected one of the two measured parameters,
carrying out a first correction operation by multiplying said first spectrum profile by said initial correction function, to obtain a first corrected profile,
selecting a second value for the selected one of the two measured parameters,
selecting another spectrum profile, corresponding to the second value for the selected one of the two measured parameters, and
carrying out another correction operation by multiplying said another spectrum profile by another correction function, said another correction function being equal to a sum of the initial correction function and the first corrected profile.

17. An apparatus for processing a two-parameter spectrum by one or more computers in a computer system, comprising:
means for obtaining a two-parameter spectrum, representing a distribution of a number of photons, as a function of two measured parameters,
means for selecting one of the two measured parameters of said two-parameter spectrum,
means for selecting an initial correction function,
means for selecting a first value for the selected one of the two measured parameters,
means for selecting a first spectrum profile, corresponding to the first value for the selected one of the two measured parameters,
means for carrying out a first correction operation by multiplying said first spectrum profile by said initial correction function, to obtain a first corrected profile,
means for selecting a second value for the selected one of the two measured parameters,
means for selecting another spectrum profile, corresponding to the second value for the selected one of the two measured parameters, and
means for carrying out another correction operation by multiplying said another spectrum profile by another correction function, said another correction function being equal to a sum of the initial correction function and the first corrected profile.

18. The apparatus as claimed in claim 17, wherein
said means for carrying out said first correction operation divides said initial correction function by a first integral, and
means for carrying out said another correction operation divides said another correction function by another integral.

19. The apparatus as claimed in claim 18, wherein said first integral is an integral of said initial correction function and wherein said another integral is an integral of said another correction function.

20. The apparatus as claimed in claim 17, wherein
said means for carrying out said first correction operation multiplies said initial correction function by an integral of said first spectrum profile, such integral being divided by an integral of said first spectrum profile multiplied by said initial correction function, and
said means for carrying out said another correction operation multiplies said another correction function by an integral of said another spectrum profile, such integral being divided by an integral of said another spectrum profile multiplied by said another correction function.

21. The apparatus as claimed in claim 17, wherein said two parameter spectrum is representative of a distribution of the number of photons varying across various rise-time channels and various amplitude channels, said means for carrying said another correction operation redistributes said another spectrum profile according to an uncertainty function, and said means for carrying out said another correction operation divides said another spectrum profile by a convolution of said another correction function and said uncertainty function, and convolutes said another spectrum profile by said uncertainty function.

22. The apparatus as claimed in claim 17, wherein the two-parameter spectrum is a spectrum that has previously been corrected by homothety.

* * * * *